K. H. LOOMIS.
Nut-Lock.
No. 218,991.  Patented Aug. 26, 1879.
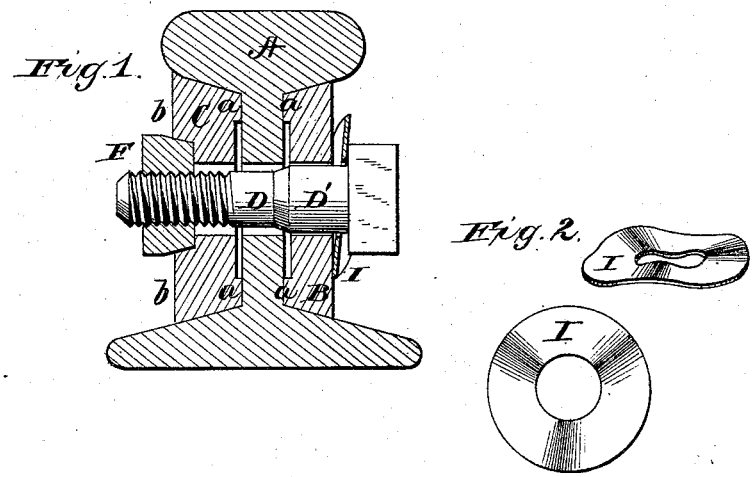

UNITED STATES PATENT OFFICE.

KELLOGG H. LOOMIS, OF NEW YORK, N. Y.

IMPROVEMENT IN NUT-LOCKS.

Specification forming part of Letters Patent No. 218,991, dated August 26, 1879; application filed April 30, 1879.

*To all whom it may concern:*

Be it known that I, KELLOGG H. LOOMIS, of New York, in the county of New York, and in the State of New York, have invented certain new and useful Improvements in Railway-Joint Fasteners; and do hereby declare that the following is a full, clear, and exact description thereof, reference being had to the accompanying drawings, and to the letters of reference marked thereon, making a part of this specification.

The nature of my invention consists in the construction and arrangement of a railway-joint fastening, as will be hereinafter more fully set forth.

In order to enable others skilled in the art to which my invention appertains to make and use the same, I will now proceed to describe its construction and operation, referring to the annexed drawings, in which—

Figure 1 is a cross-section of my invention. Fig. 2 represents an elastic washer used therein.

A represents a railroad-rail, with the fish-bars B and C placed on opposite sides thereof. These fish-bars are on their inner sides formed at the top and bottom with longitudinal flanges or ribs $a\ a$, so as to leave a longitudinal recess in their centers, making said fish-bars slightly yielding to the pressure when the bolt is screwed up.

On the outer side of the fish-bar C are also formed top and bottom flanges $b\ b$, which form a longitudinal groove or recess in the center. In this latter groove or recess the nut F is placed. The bolt D is inserted from the opposite side and screwed into the nut F, as shown. Under the head of the bolt is placed an elastic washer, I, formed of corrugated sheet metal.

The groove on the outside of the fish-bar C is made slightly tapering, to correspond with the shape of the nut F.

The bolt D is formed with an enlargement, D', next to the head, said enlargement fitting the hole in the fish-bar B.

The hole for the passage of the threaded end of the bolt in the fish-bar C is made larger than said part of the bolt; and as the nut F is held rigidly in the groove on the outside of said fish-bar, on account of the sloping walls of said groove and corresponding shape of the nut, it makes no difference how much vibration of the parts may occur, the fish-bar will never come in contact with the threaded part of the bolt, which would, if permitted, soon injure and wear out the thread.

The object of my invention is to so prepare the parts and put them together that there will be no opportunity for either the bolt or nut to vibrate, as it is the shaking or jarring that causes the nut to work off in the ordinary way.

There is little liability of the bolt working back or out of its position, as there is nearly always more or less friction on it from the several pieces through which it passes. In my case I make the bolt large enough at the head, so that just before the binding of the joint together the enlargement D' is forced into the hole in the fish-plate, so as to prevent its shaking at this end, and, of course, the bolt being screwed tightly into the nut, and, again, the tapering nut, being jammed in the tapering groove, keeps the parts firm. It would not do to have the bolt the same, or the large size the whole length, as it would be difficult to put the joint together.

Having thus fully described my invention, what I claim as new, and desire to secure by Letters Patent, is—

In a railroad-joint fastening, the fish-bar C, having an exterior groove with sloping walls, and the bolt-hole made larger than the bolt, in combination with the beveled nut F and the bolt D and the corrugated or spring washer I, placed under the head of the bolt, substantially as and for the purposes herein set forth.

In testimony that I claim the foregoing I have hereunto set my hand and seal this 29th day of April, 1879.

KELLOGG H. LOOMIS. [L. S.]

Witnesses:
 GEORGE OWEN,
 JOHN M. O'BRIEN.